(12) United States Patent
McAndrews et al.

(10) Patent No.: US 9,399,496 B2
(45) Date of Patent: Jul. 26, 2016

(54) METHOD OF SHOCK ABSORBER ADJUSTMENT

(71) Applicant: SPECIALIZED BICYCLE COMPONENTS, INC., Morgan Hill, CA (US)

(72) Inventors: Michael McAndrews, Capitola, CA (US); Robb Jankura, Morgan Hill, CA (US); Brian Lampman, Aptos, CA (US)

(73) Assignee: SPECIALIZED BICYCLE COMPONENTS, INC., Morgan Hill, CA (US)

( * ) Notice: Subject to any disclaimer, the term of this patent is extended or adjusted under 35 U.S.C. 154(b) by 168 days.

(21) Appl. No.: 14/274,461

(22) Filed: May 9, 2014

(65) Prior Publication Data

US 2014/0246118 A1    Sep. 4, 2014

Related U.S. Application Data

(62) Division of application No. 13/243,216, filed on Sep. 23, 2011, now Pat. No. 8,740,237.

(51) Int. Cl.
| | |
|---|---|
| *F16F 9/43* | (2006.01) |
| *B62K 25/06* | (2006.01) |
| *B62K 25/08* | (2006.01) |
| *F16F 9/02* | (2006.01) |
| *B60G 17/056* | (2006.01) |

(Continued)

(52) U.S. Cl.
CPC ............... *B62K 25/06* (2013.01); *B62K 25/08* (2013.01); *F16F 9/02* (2013.01); *F16F 9/43* (2013.01); *B60G 17/056* (2013.01); *B62K 25/286* (2013.01); *B62K 2025/048* (2013.01); *F16F 2230/06* (2013.01)

(58) Field of Classification Search
CPC ............. F16F 9/43; F16F 9/435; F16F 9/437; F16F 2230/06; B62K 2025/048
See application file for complete search history.

(56) References Cited

U.S. PATENT DOCUMENTS

| | | |
|---|---|---|
| 3,837,355 A | 9/1974 | Wirges |
| 5,301,973 A | 4/1994 | Truchinski |
| 5,511,811 A | 4/1996 | Pileggi |

(Continued)

FOREIGN PATENT DOCUMENTS

| | | |
|---|---|---|
| DE | 102007056313 | 5/2009 |
| EP | 0898092 | 2/1999 |

(Continued)

OTHER PUBLICATIONS

2004 Fox FORX Owner's Manual.

(Continued)

*Primary Examiner* — Nicholas J Lane
(74) *Attorney, Agent, or Firm* — Knobbe Martens Olson & Bear LLP (57) ABSTRACT

A bicycle assembly can include a front or rear suspension system with a shock absorber. A front suspension system can be a suspension fork. A rear suspension system can include a rear shock absorber. The shock can have a shock body and a pressurized main air chamber within the shock body to act as an air spring. The shock can also have a valve configured to receive a pump for adding air to the main air chamber. A secondary air chamber and a control member can be used to reduce the pressure within the main air chamber by venting the secondary air chamber to the atmosphere.

9 Claims, 8 Drawing Sheets

(51) Int. Cl.
*B62K 25/28* (2006.01)
*B62K 25/04* (2006.01)

(56) References Cited

U.S. PATENT DOCUMENTS

| | | | |
|---|---|---|---|
| 5,887,857 A | 3/1999 | Perrin | |
| 5,961,102 A | 10/1999 | Oyaizu | |
| 5,971,117 A | 10/1999 | Grundei et al. | |
| 6,105,988 A | 8/2000 | Turner et al. | |
| 6,135,434 A | 10/2000 | Marking | |
| 6,213,261 B1 | 4/2001 | Kunkel | |
| 6,328,292 B1 | 12/2001 | Jarstad | |
| 6,520,524 B1 | 2/2003 | Costa | |
| 7,284,766 B2 | 10/2007 | Temmerman et al. | |
| 7,703,585 B2 | 4/2010 | Fox | |
| 7,963,509 B2 | 6/2011 | Fox | |
| 8,162,343 B2 | 4/2012 | Weiss et al. | |
| 8,459,418 B2 | 6/2013 | Becker et al. | |
| 8,607,942 B2 | 12/2013 | Becker et al. | |
| 2004/0145101 A1 | 7/2004 | Olds | |
| 2007/0080515 A1 | 4/2007 | McAndrews | |
| 2008/0246234 A1* | 10/2008 | Krauss | B60G 17/0155 280/5.514 |
| 2008/0296814 A1 | 12/2008 | Franklin et al. | |
| 2009/0236807 A1 | 9/2009 | Wootten et al. | |
| 2009/0267316 A1 | 10/2009 | Gonzalez et al. | |
| 2010/0044975 A1 | 2/2010 | Yablon et al. | |
| 2010/0109277 A1 | 5/2010 | Furrer | |
| 2010/0117329 A1 | 5/2010 | Achenbach et al. | |
| 2010/0244340 A1 | 9/2010 | Wootten et al. | |
| 2010/0252972 A1 | 10/2010 | Cox et al. | |
| 2010/0276906 A1 | 11/2010 | Galasso et al. | |
| 2011/0094833 A1* | 4/2011 | Marking | F16F 9/064 188/1.11 R |
| 2011/0202236 A1 | 8/2011 | Galasso et al. | |
| 2011/0204549 A1 | 8/2011 | Fox | |
| 2011/0215551 A1 | 9/2011 | Galasso et al. | |
| 2012/0049427 A1 | 3/2012 | Hsu | |
| 2012/0080279 A1 | 4/2012 | Galasso et al. | |
| 2012/0136537 A1 | 5/2012 | Galasso et al. | |
| 2012/0325605 A1 | 12/2012 | Talavasek | |
| 2013/0075998 A1 | 3/2013 | McAndrews et al. | |

FOREIGN PATENT DOCUMENTS

| | | |
|---|---|---|
| GB | 1093327 | 11/1967 |
| GB | 1238508 | 7/1971 |
| JP | 2000-266099 | 9/2000 |
| JP | 2006-97880 | 4/2006 |
| TW | 201287 | 3/1993 |
| TW | 485936 | 5/2002 |
| TW | 512801 | 12/2002 |

OTHER PUBLICATIONS

Bikemag, Tested: 2005 Fox TALAS RLC, http://www.bikemag.com/blog/080105_fox_talas_rlc_suspension_fork_test_review/, retrieved on Dec. 13, 2012.

BoXXer World Cup Suspension Tuning Guide, SRAM Corporation, Copyright 2009.

Cycling News, photograph What's inside my TALAS, http://www.cyclingnews.com/features/photos/fox-racing-shox-delivers-even-more-performance-sram-continues-winning-ways/11865, posted Apr. 21, 2007, retrieved on Dec. 13, 2012.

Extended European Search Report for European Application No. 11172073.6 dated Oct. 12, 2011.

Fox Racing Shox, 2005 Rear Shock Owner's Manual.

Mtbr Forums, TALAS II—How exactly does it work? (2007 Fox 32 TALAS Fork (TALAS II)), http://forums.mtbr.com/shocks-suspension/talas-ii-how-exactly-does-work-350074.html, retrieved on Dec. 13, 2012, forum discussion first post on Oct. 21, 2007 and last post dated Oct. 25, 2007.

Mtbr Forums, TALAS Spring Side Disassembly (Pics!), (2003 Fox 32 TALAS R Fork (TALAS I)) http://forums.mtbr.com/shocks-suspension/talas-spring-side-disassembly-pics-452931.html, retrieved on Dec. 13, 2012, forum discussion first post on Sep. 18, 2008 and last post dated Dec. 19, 2008.

Mtbr Foums, Attention Fox TALAS Experts—Help Please!, (2009 Fox 36 TALAS RC2 Fork (TALAS III)) http://forums.mtbr.com/shocks-suspension/attention-fox-talas-experts-help-please-610097.html, retrieved on Dec. 13, 2012, forum discussion first post on Apr. 16, 2010 and last post dated Apr. 20, 2010.

Whistler Mountain Bike, Interbike 2007, fox-talas-cutaway, http://www.whistlermountainbike.com/wmb/gallery/showphoto.php/photo/1371/title/fox-talas-cutaway/cat/583, retrieved on Dec. 13, 2012, posted Oct. 5, 2007.

* cited by examiner

METHOD OF SHOCK ABSORBER ADJUSTMENT

CROSS-REFERENCE TO RELATED APPLICATIONS

This application is a divisional of U.S. application Ser. No. 13/243,216, filed Sep. 23, 2011, now U.S. Pat. No. 8,740,237, the entire contents of which are hereby incorporated by reference herein and made a part of this specification. Any and all priority claims identified in the Application Data Sheet, or any correction thereto, are hereby incorporated by reference under 37 CFR 1.57.

BACKGROUND OF THE INVENTION

1. Field of the Invention

The present invention relates generally to bicycle suspension systems. In particular, the present invention relates to shock absorbers and suspension assemblies suitable for use in connection with off-road bicycles.

2. Description of the Related Art

Off-road bicycles, or mountain bikes, may be equipped with front and rear suspension assemblies operably positioned between the frame of the bicycle and the front and rear wheels, respectively. Providing front and rear suspension on a mountain bike potentially improves handling and performance by absorbing bumps, and other rough trail conditions, which may be encountered while riding off-road. However, because mountain bikes are typically pedal-driven, i.e., use the rider's power output to propel the bicycle, the provision of rear suspension, especially, may undesirably absorb a rider's power output, resulting in wasted effort.

Accordingly, rear suspension systems commonly incorporated on engine-driven vehicles, such as motorcycles, have proven undesirable for use with pedal-driven vehicles, such as mountain bikes. In addition, because a mountain bike is propelled solely by power output from the rider, it is desirable that the rear suspension assembly be lightweight. Rear suspension systems of engine-driven vehicles commonly emphasize strength over weight and, therefore, have not been widely incorporated on mountain bikes.

Bicycle shock absorbers having rider-adjustable compression and rebound damping characteristics have been used to match a desired level of pedaling efficiency and ride comfort with a type of terrain encountered. A rider may adjust the compression damping setting of a shock absorber to trade improved pedaling efficiency for improved bump absorption. For example, an adjustable shock absorber may desirably be set to a firm setting while a rider is on a steep hill climb to increase the amount of pedaling energy reaching the driven wheel and reduce the amount of pedaling energy dissipated by the suspension. Conversely, an adjustable shock absorber may desirably be set to a relatively soft compression damping setting where a rider is traveling fast downhill.

In addition, many bicycle shock absorbers have other rider-adjustable settings. For example, some bicycle shock absorbers allow the user to set the sag. Sag refers to the amount of movement experienced by the suspension under just the static load, or body weight, of the rider.

All of these different adjustments can be overwhelming to a user, especially a less experienced rider. Not only do some shock absorbers have multiple adjustments but some adjustments require a specific procedure that can be time consuming and difficult to perform.

For example, to set the sag on currently available air shock absorbers, a specific setup procedure, which can include multiple steps and adjustments, is required to ensure maximum performance. Generally, the rider has to adjust the air pressure and the sag position multiple times to achieve the desired sag when sitting on the bike. This includes measuring the shock absorber, filling the shock with air, sitting on the bike, measuring the sag, letting air out of the shock or adding more air, getting back on the bike, and measuring the sag again. These steps are repeated until the sag is set to the desired position.

The desired sag position may be given in a chart in a user manual and indicated as a length or a sag percentage based on the particular shock and the rider's weight among other factors. This can further complicate the procedure.

Because of the perceived difficulty of certain, if not all of the adjustments, some riders may have the shock absorber adjusted or set-up when it is originally purchased and then make no further adjustments. In addition, certain bike shops or consumers may not make all of the right adjustments. This may be in order to save time or just because of lack of understanding of the correct procedure and settings.

Accordingly, a need exists for a shock absorber that simplifies at least some of the adjustment procedures.

SUMMARY OF THE INVENTION

In some embodiments, a bicycle assembly can comprise a shock. The shock can include a shock body, a pressurized main air chamber within the shock body to act as an air spring, a secondary air chamber positioned within the main air chamber, a valve, and an outer housing. The valve can be configured to receive a pump for adding air to both the main air chamber and the secondary air chamber. The outer valve housing can surround the valve. The outer valve housing can be movable with respect to the shock body from a first position where the secondary air chamber is in fluid communication with the main air chamber, and a second position where the secondary air chamber is in fluid communication with atmospheric air.

The shock may also include a plurality of seals surrounding the outer valve housing and engagable with a wall of the shock body. In the second position, the outer valve housing, the plurality of seals, and the wall can allow air to pass around the outer valve housing to the atmosphere. The shock can be a suspension fork or part of a rear suspension.

According to some embodiments, a shock can comprise a shock body, a pressurized main air chamber within the shock body to act as an air spring, a valve configured to receive a pump for adding air to the main air chamber, a secondary air chamber, and a control member. The control member can be movable with respect to the shock body. The secondary air chamber and the control member can be operably coupled to remove air and reduce pressure in the main air chamber. In a first position of the control member, the secondary air chamber can be at the same pressure as and in fluid communication with the main air chamber. In a second position, the secondary air chamber can be at atmospheric pressure and in fluid communication with atmospheric air where the air removed from the main air chamber does not leave the shock through the valve.

In some embodiments, the secondary air chamber is positioned inside of the main air chamber. The valve can comprise a Schrader valve or a Presta valve. The shock may further comprise a damper. The shock may further comprise an outer valve housing with the valve positioned within the inside of the outer valve housing and configured such that when the control member is in the second position, air can leave the secondary chamber passing around the outside of the outer valve housing.

Some embodiments of shock may comprise a shock body, a pressurized main air chamber within the shock body to act as an air spring, a secondary air chamber positioned within the shock body, a valve and a control member. The valve can be configured to receive a pump for adding air to both the main air chamber and the secondary air chamber such that the main air chamber and the secondary air chamber have the same pressure. The control member can be configured to reduce the pressure within the main air chamber by venting the secondary air chamber to the atmosphere.

In some embodiments, the control member can comprise an outer valve housing surrounding the valve. The secondary air chamber may be positioned within the main air chamber.

A method of adjusting the air pressure within a shock can comprise a number of different steps. The method may include one or more of the following: connecting a pump to a first valve on a shock body; injecting air from the pump into a main air chamber and a secondary air chamber within the shock; removing the pump from the first valve; actuating a second valve on the shock body by moving the second valve from an initial position to a second position, wherein the main air chamber and the secondary air chamber are in fluid communication in the initial position but are not in fluid communication in the second position; releasing air from the secondary air chamber to reduce the pressure within the shock, the secondary air chamber being in fluid communication with the atmosphere but not the main air chamber; and returning the second valve to the initial position and bringing the secondary chamber into fluid communication with the main air chamber.

In some embodiments, the method may also involve wherein actuating a second valve comprises depressing a valve housing surrounding the first valve and/or wherein releasing air from the secondary air chamber comprises allowing air to leave the secondary air chamber, the air flowing to the atmosphere between an exterior surface of the valve housing and a surface of the shock body and not through the first valve.

BRIEF DESCRIPTION OF THE DRAWINGS

Various embodiments are depicted in the accompanying drawings for illustrative purposes, and should in no way be interpreted as limiting the scope of the inventions, in which like reference characters denote corresponding features consistently throughout similar embodiments.

DETAILED DESCRIPTION OF THE PREFERRED EMBODIMENT

Figure 1:
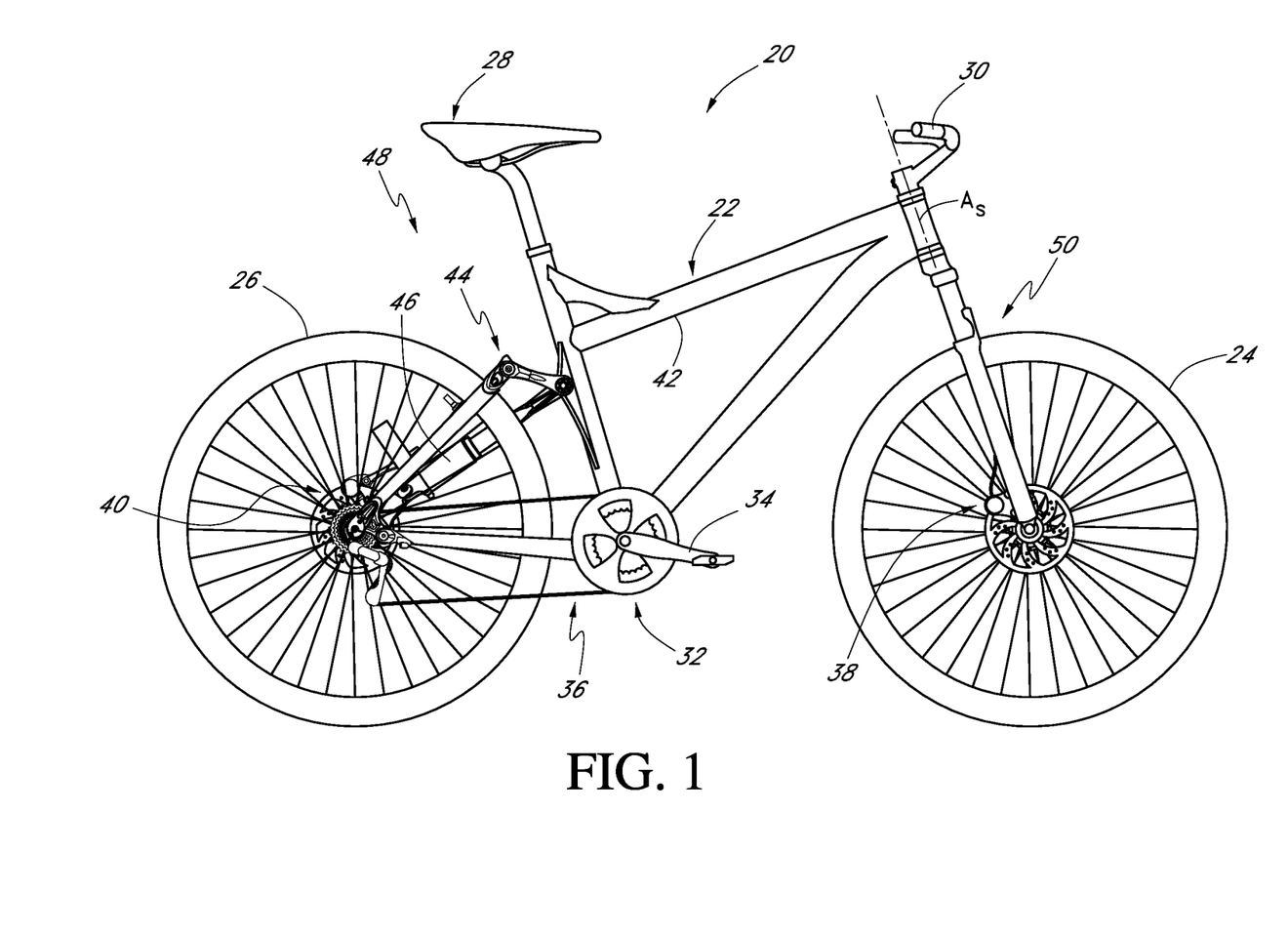
FIG. 1 is a side view of an embodiment of a bicycle frame.

FIG. 1 illustrates a bicycle, and more particularly, an off-road bicycle or mountain bike 20. To aid in the description of the mountain bike 20 and the present suspension assembly, certain directional or relative terms may be used herein. The term "longitudinal" refers to a direction, length or a location between the front and rear of the bicycle 20. The term "lateral" refers to a direction, length or location between the sides of the bicycle 20. Heights may be described as relative distances from a surface upon which the bicycle 20 is operated in a normal manner. Thus, the terms "above" or "below" generally apply to the bicycle as assembled, and being oriented as it would be normally ridden, or as it is depicted in any of the relevant figures. Front, rear, left, and right directions generally refer to those directions from the perspective of a rider normally seated on the bicycle 20.

With reference to FIG. 1, the mountain bike 20 includes a frame assembly 22, a front wheel 24 and rear wheel 26. The frame assembly 22 supports a seat assembly 28 at a location spaced rearward from a handlebar assembly 30. The handlebar assembly 30 is rotatably supported by the frame assembly 22 and is coupled to the front wheel 24 such that rotation of the handlebar 30 results in rotation of the front wheel 24 about a steering axis $A_s$ of the mountain bike 20.

The mountain bike 20 also includes a drive train 32 that is configured to allow a rider of the mountain bike 20 to supply power to one or both of the wheels 24, 26. In the illustrated arrangement, the drive train 32 includes a pedal crank 34 that is coupled to the rear wheel 26 by a multispeed chain drive transmission 36. The multispeed chain drive transmission 36 may include one or more gears, or chain rings, coupled to the pedal crank 34 and one or more gears, or sprockets, coupled to the rear wheel 26. The chain rings and sprockets are coupled by an endless drive chain that is capable of transmitting torque from the pedal crank 34 to the rear wheel 26. One or more shifting mechanisms, such as a derailleur, may be provided to shift the chain between the chain rings or sprockets. The shifting mechanism may be controlled by rider controls mounted on the handlebar assembly 30.

The mountain bike 20 includes front and rear brake assemblies 38, 40 associated with the front and rear wheels 24, 26, respectively. The brake assemblies 38, 40 may be controllable by a rider of the mountain bike 20, typically via hand controls provided on the handlebar 30. Although the illustrated brake assemblies 38, 40 are disc brakes, other suitable types of brakes assemblies, such as rim brakes, for example, may also be used.

Preferably, the rear wheel 26 is supported for movement relative to at least a portion of the frame assembly 22. More particularly, the frame assembly 22 includes a mainframe portion 42 and a subframe portion 44. The bicycle 20 also includes a shock absorber 46 as part of a rear suspension assembly 48 to influence movement of the subframe 44, and the rear wheel 26, relative to the mainframe 42. In the illustrated arrangement, the subframe 44 is a multi-linkage arrangement that includes a plurality of interconnected linkage members. However, as will be appreciated by one of skill in the art, a multitude of possibilities for the exact configuration of the mainframe 42 and subframe 44 are possible. Moreover, in some arrangements, the bike 20 may be of a rigid frame design, or hardtail, in which no rear suspension assembly is provided. The mainframe 42 and subframe 44 may be of any suitable shape and may be constructed of any suitable material or combination of materials, as will be appreciated by one of skill in the art.

The mountain bike 20 also incorporates a front suspension assembly 50 that movably supports the front wheel 24 relative to the mainframe 42 of the frame assembly 22. The front suspension assembly 50 as illustrated herein is a suspension fork 50 that is supported at its upper end by the mainframe 42 for rotation relative to the frame assembly 22 of the mountain bike 20. The suspension fork 50 rotatably supports the front wheel 24 at its lower end. The handlebar 30 is coupled to the suspension fork 50 such that rotation of the handlebar 30 causes rotation of the front suspension fork 50, and thus the front wheel 24, about the steering axis $A_s$.

The present fork is described herein in the form of a front suspension fork for a mountain bike 20. As used herein, the term "fork" is used in its ordinary meaning and includes various forms of a fork for a vehicle and, in particular, for a bicycle. Thus, the term "fork" can have one or more legs or struts. In addition, linkage-type front suspension assemblies are also intended to fall within the definition of a "fork." Moreover, certain features, aspects and advantages may be utilized in other vehicles, as well. For example, certain features, aspects and advantages may be utilized in other two-wheeled vehicles, such as motorcycles, for example. In addition, certain features, aspects and advantages may be utilized in vehicles having another number of wheels, (e.g., an automobile) or having no wheels (e.g., a snowmobile). As will be appreciated by one of skill in the art, a multitude of possibilities for the exact configuration of the fork are possible. Moreover, in some arrangements, the fork may be of a rigid design in which no suspension assembly is provided.

Figure 2:
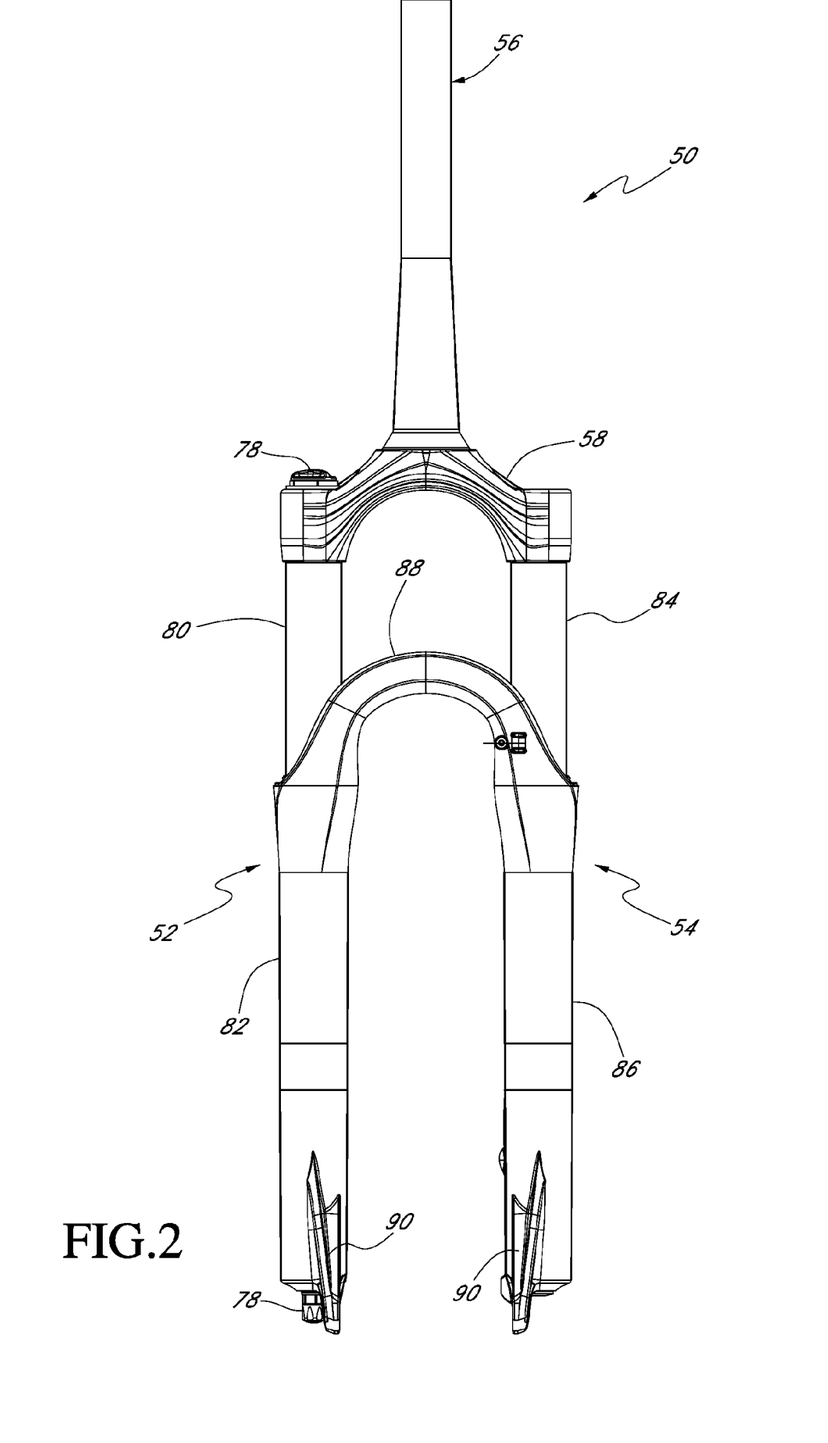
FIG. 2 illustrates a bicycle suspension fork.

With reference to FIG. 2, the suspension fork 50 is shown separated from the remainder of the mountain bike 20. In the illustrated arrangement, the suspension fork 50 includes a first fork leg 52 and a second fork leg 54 that straddle the front wheel 24 of the mountain bike 20. The upper ends of the fork legs 52, 54 are coupled to a steer tube, or steerer 56 through a crown 58. The steer tube 56 is received within a head tube of the mainframe 42 of the bicycle frame assembly 22.

As described above, a lower end of the suspension fork 50 is configured to carry the front wheel 24 of the mountain bike 20. In the illustrated arrangement, each fork leg 52, 54 includes a wheel mount 90 which cooperate with one another to support the front wheel 24. The wheel mounts 90 are often referred to as dropouts because the mounts 90 often include a generally vertical recess that is open at its lower end. The recess permits an axle of the front wheel 24 to "drop out" of the lower end of the recess when the wheel retention mechanism is loosened. However, the wheel mounts 90 may be of any suitable construction to support an axle of the front wheel 24, including the through-axle type mounting arrangement in which the wheel mounts 90 completely surround the axle of the front wheel 24. Other suitable arrangements may also be used.

The fork legs 52, 54 include an upper fork leg portion or stanchion tube 80, 84 ("upper fork leg or tube") and a lower fork leg portion 82, 86 ("lower fork leg or tube"). The respective upper and lower fork legs are telescopically engaged with one another such that an overall length of the fork leg 52, 54 may vary. The crown 58 may interconnect the upper ends of the upper fork legs 80, 84. Similarly, the lower fork legs 82, 86 maybe interconnected by an arch 88. The arch 88 preferably is integrally formed with the legs 82, 86. In one arrangement, the legs 82 and 86, the arch 88 and the wheel supports 90 are cast as a single piece. However, other suitable arrangements are possible as well. The crown 58 and the arch 88 resist twisting of the upper fork legs 80, 84 and lower fork legs 82, 86, respectively.

The suspension fork 50 further can include a spring and/or a damper as is known in the art. The suspension fork 50 can include certain controls 78 to control certain characteristics of the suspension. These controls can include, rebound adjust, damping control, shock compression, lockout, air pressure, and other adjustments. The controls 78 can include adjustment knobs, levers, switches, dials, valves, etc.

Air Spring Suspension

Many types of suspension systems, whether they are front or rear suspension systems, such as a suspension fork or a rear shock, may use air to create a spring force. This may be in addition to or instead of a mechanical spring, such as a metal coil spring. Air springs are generally the spring system of choice on mountain bikes due to the lighter weight (compared to coil or elastomer springs) as well as the broad range of rate adjustability achieved by simply changing the air pressure in the air spring chamber. This broad spring rate adjustability can also cause many set-up problems. As mentioned previously, it is desirable to setup a suspension system according to the particular characteristics of a user. This can be a daunting process for many people, which may result in the suspension system being setup once when the bike is purchased and it may not be adjusted again. Thus, it is desirable to simplify the setup process while allowing the user to have more, yet simpler control of the suspension system.

Figure 3:
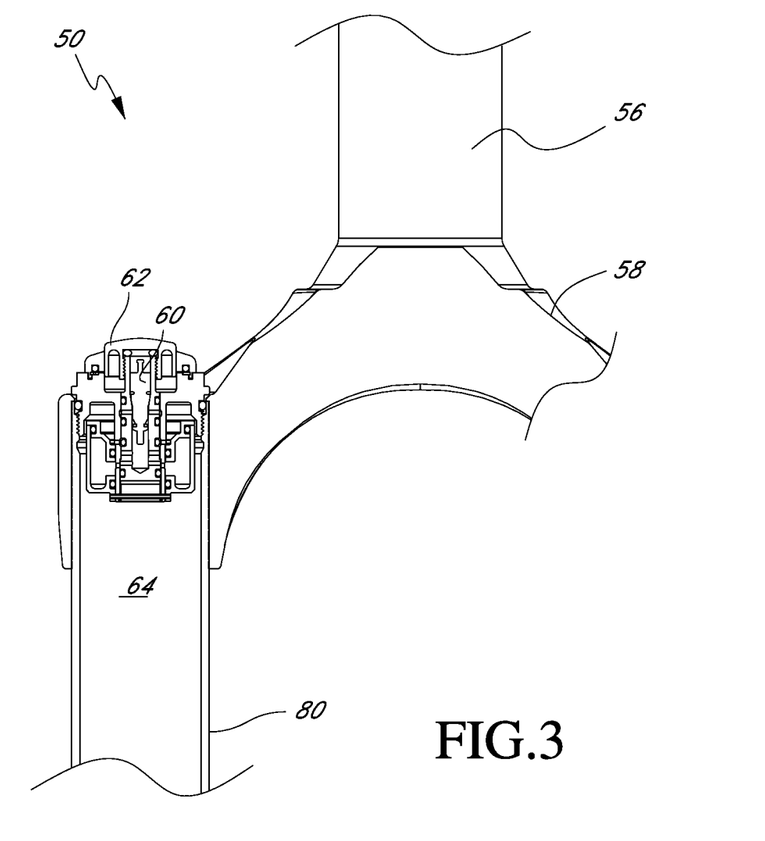
FIG. 3 is a cross section of a portion of the bicycle suspension fork of FIG. 2.

In general, a shock with an air spring design, such as the suspension fork 50 shown in FIG. 3, includes a first valve 60 (represented schematically) to allow air to be added or removed from the shock. The first valve 60 desirably is a Schrader valve, though other types of valves such as Presta can also be used. The shock may also include a cap 62 that can cover and seal the first valve 60 from dirt, grime, and undesired contact. The cap 62 can be removed to allow access to the first valve 60. Air can be released from the shock's air chamber 64 by simply depressing the internal valve body, the same as when releasing air from a bicycle or car tire. Air can be added to the air chamber 64 through a pump attached to the first valve 60.

High pressure shock pumps, available through shock and bike companies as an aftermarket purchase, are generally used to add air to shocks. Many of these pumps also include a button to allow the user to release or bleed off air. Whether air is released through a pump or solely through the valve, there is little control on the amount of air released. The control is solely by feel. The amount of air released is determined by how far the valve or button is depressed and for how long. In other words, the amount bled varies each time a bleed down is attempted.

There are additional problems with bleeding off air pressure from the air spring with a high pressure shock pump. For one, on the trail, the user may not have a shock pump readily available. Also, attaching a shock pump to a suspension fork or rear shock generally reduces the air pressure within the shock by 7-10 psi. This is because the air from the air spring must fill the pump hose and gauge to equalize the pressure and allow for a proper pressure reading. This pressure drop due to pump installation in many cases is more of a pressure drop than is desired for proper adjustment.

Figure 4:
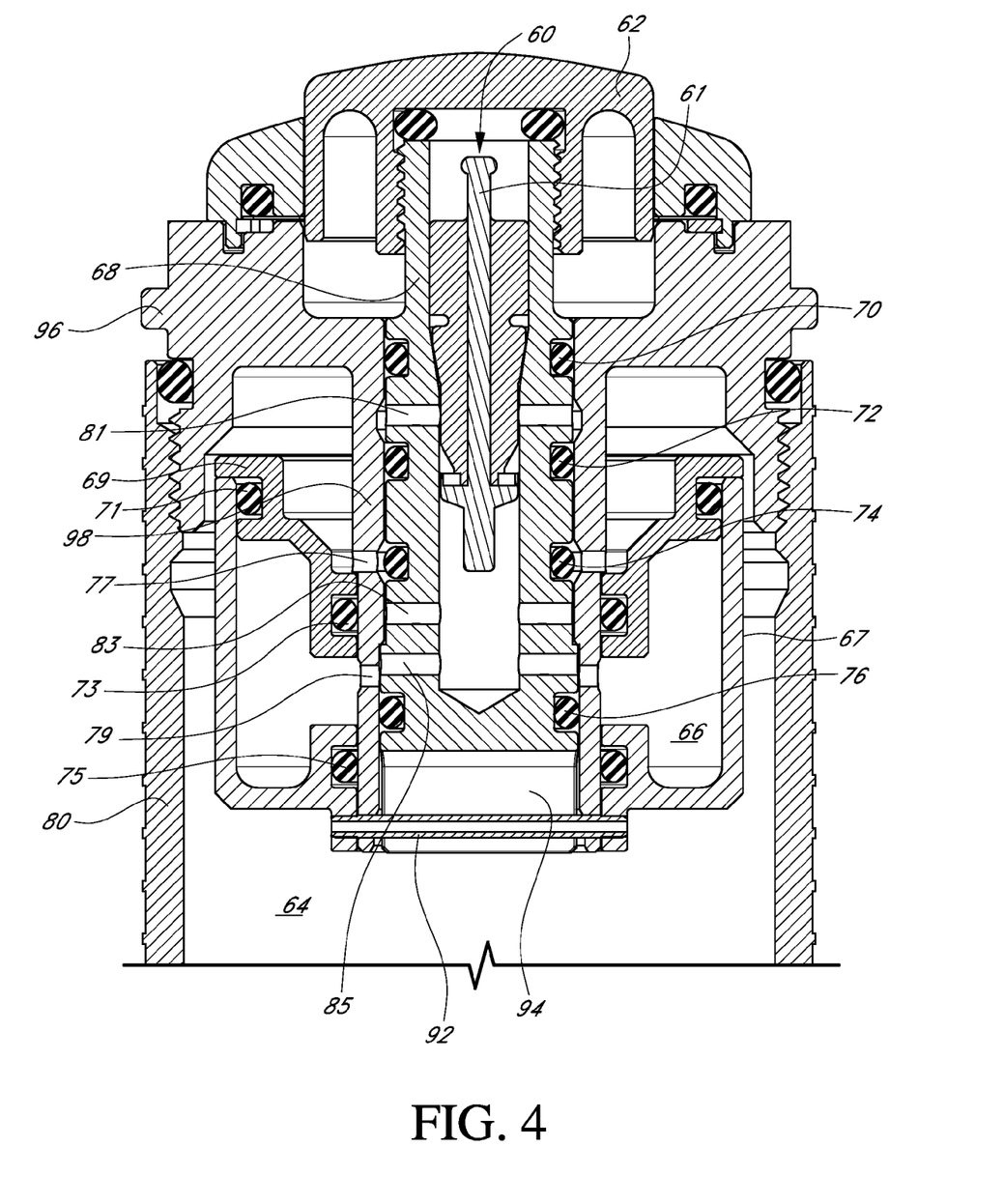
FIG. 4 is a cross section of a portion of a bicycle fork.

Looking now to FIG. 4, a portion of an improved shock absorber is shown. As will be seen, the shock absorber includes a metering mechanism to allow for the incremental release of air for the reduction of air pressure within the shock. The improved shock absorber can bleed down the air pressure of an air spring system in a controlled, precise way. In some embodiments, the improved shock absorber can repeatably incrementally release air from the shock independent of the particular user.

The shock absorber is shown with a first valve 60 that can communicate with a main air chamber 64. The first valve 60 can be a Schrader valve, or other known valves and can be used to add air to or release air from the main air chamber 64. In this way the shock absorber can become pressurized to act as an air spring. The illustrated first valve 60 is a Schrader valve that includes an outer valve housing 68 into which a valve core is threaded. In a Schrader valve, the valve core is an internal valve body or poppet valve 61, which is assisted by a spring. A cap 62 can cover the first valve 60 to protect the valve as has been discussed.

The shock can also include a secondary air chamber or a volume adjusted chamber 66. The secondary air chamber 66 can be pressurized with the main air chamber 64 but then later, if desired, sealed off from the main air chamber 64 and vented to the atmosphere. This can allow an incremental decrease in air and air pressure because desirably only the air in the secondary air chamber 66 is released. The size of the secondary air chamber 66 can be controlled so that only a desired amount of air is released. In some embodiments, the secondary air chamber 66 can be configured or positioned in different ways than those illustrated herein while still providing the benefit of controlled incremental air or pressure release from the shock.

As shown, the secondary air chamber 66 is positioned within the shock body 96 and further within the main air chamber 64. The secondary air chamber 66 can be made of one or more components. The secondary air chamber 66 can be defined in part by an annular generally cylindrical secondary air chamber housing 67. The secondary air chamber 66 can also include a generally annular cap 69. The annular generally cylindrical secondary air chamber housing 67 and the generally annular cap 69 can be connected in many manners, including, adhesive, welding, friction fit, etc. As shown, these components are connected by a friction fit and also include a seal 71. Additional seals 73, 75 can be used to ensure an air tight connection with the shock body 96 at the wall 98. In some embodiments, the secondary air chamber 66 can be positioned outside of the main air chamber 64. In addition, though the secondary air chamber 66 is shown in particular relation to the first valve 60, it will be understood that the secondary air chamber 66 can be located in other positions on the shock absorber as well. In some embodiments, the secondary air chamber 66 makes up a portion of the total air spring volume.

A second valve can be used to control the fluid connections to the secondary air chamber 66. The second valve can be formed by the outer valve housing 68 positioned within the shock body 96 in a shock body end cap. The shock body end cap forms a centrally protruding cylindrical wall 98 that extends into the shock body 96. The outer valve housing 68 is positioned within this cylindrical wall 98. Thus, the outer valve housing 68 serves also serves as the internal valve body of the second valve and the cylindrical wall 98 serves as the valve housing of the second valve.

The outer valve housing 68 has a number of seals, including first seal 70, second seal 72, third seal 74, fourth seal 76, positioned around the outer valve housing 68 that can also engage the wall 98. The outer valve housing 68 can engage the wall 98 with one or more of the seals 70, 72, 74, 76 to open to close access into or from the outer valve housing 68 through the wall 98. The seals can be o-rings, or gaskets, or other types of seals. The wall 98 has a first passage 77 that can provide access into the main air chamber 64, and a second passage 79 that can provide access into the secondary air chamber 66. In addition to the central passage where the valve body 61 is positioned, the outer valve housing 68 can also include one or more channels, including a first channel 81, a second channel 83, and a third channel 85, to provide access into or out from the outer valve housing.

It can also be seen that a rod 92 or other type of fastener can be used to connect the secondary air chamber 66 to the shock body 96, such as at the wall 98. In some embodiments, all or part of the secondary air chamber 66 can be made integrally with the shock body 96. The outer valve housing 68 also is shown with a slot 94. The slot 94 cooperates with the rod 92 to allow the outer valve housing to move up and down but prevents the outer valve housing from rotating or from being advanced too far into the shock body 96.

Figure 5:
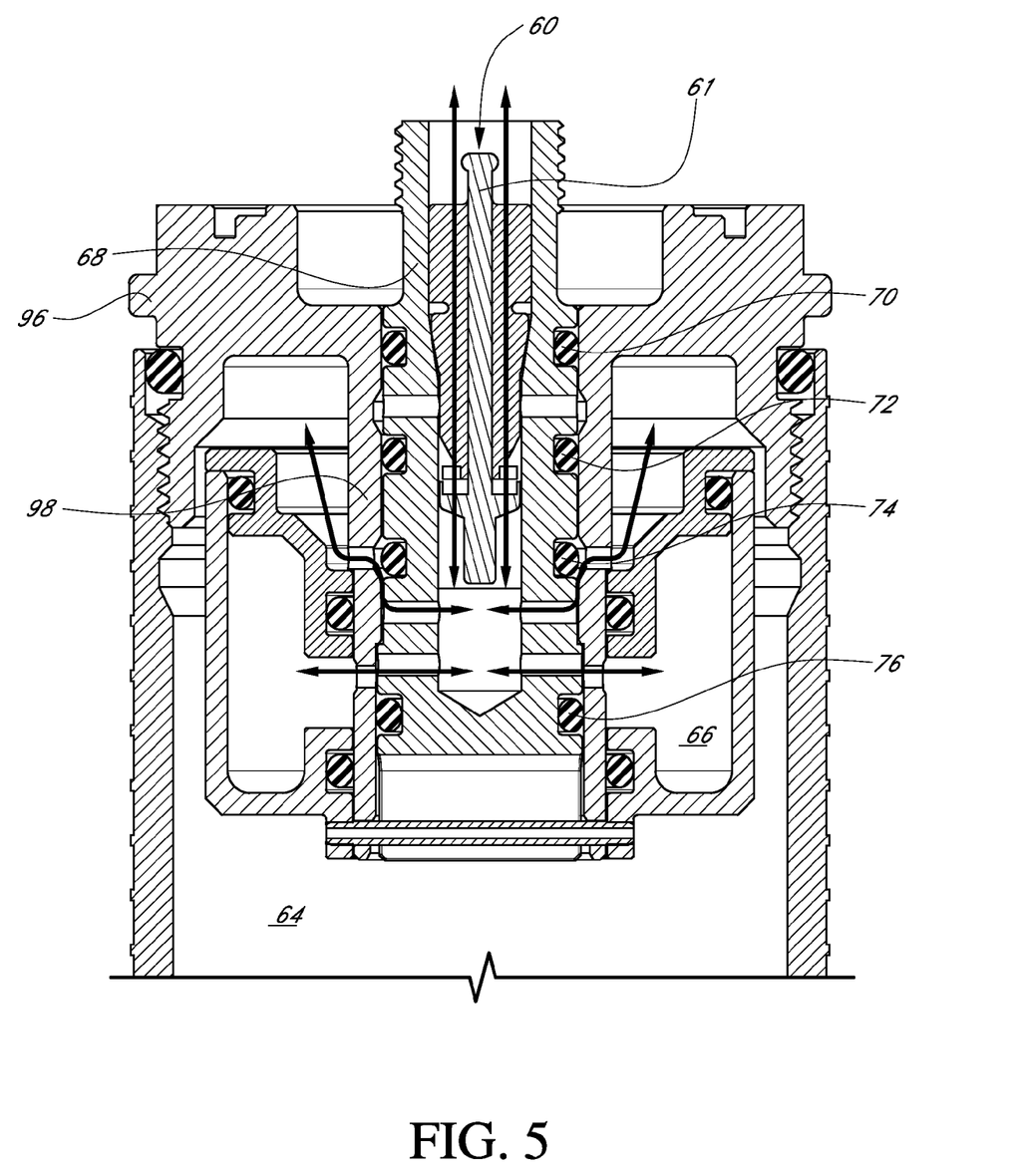
FIG. 5 is a cross section of a portion of a bicycle fork.

With reference first to FIG. 5, and then FIGS. 6-8, the functioning of the improved shock absorber will be described. FIG. 5 illustrates the fluid flow paths, represented by arrows, within the shock absorber when air is being added or released through the first valve 60. The valve body 61 is depressed, opening the valve 60 which allows air to communicate from outside of the shock to the main air chamber 64 or vice versa. The secondary air chamber 66 is also in fluid communication with both outside the shock and the main air chamber 64. Thus, the main air chamber 64 and the secondary air chamber 66 will be at the same pressure. If a shock pump is attached to the outer valve housing 68, air will be added to both the main air chamber 64 and the secondary air chamber 66.

As shown, air is able to pass into the shock through the first valve 60 and then through the wall of the outer valve housing 68 and the wall 98 of the shock body 96 where it then enters either the main air chamber 64 or the secondary air chamber 66. Air can also pass from the secondary air chamber 66 to the main air chamber or vice versa, both ways passing through the walls of the outer valve housing 68 and the shock body 96.

Figure 6:
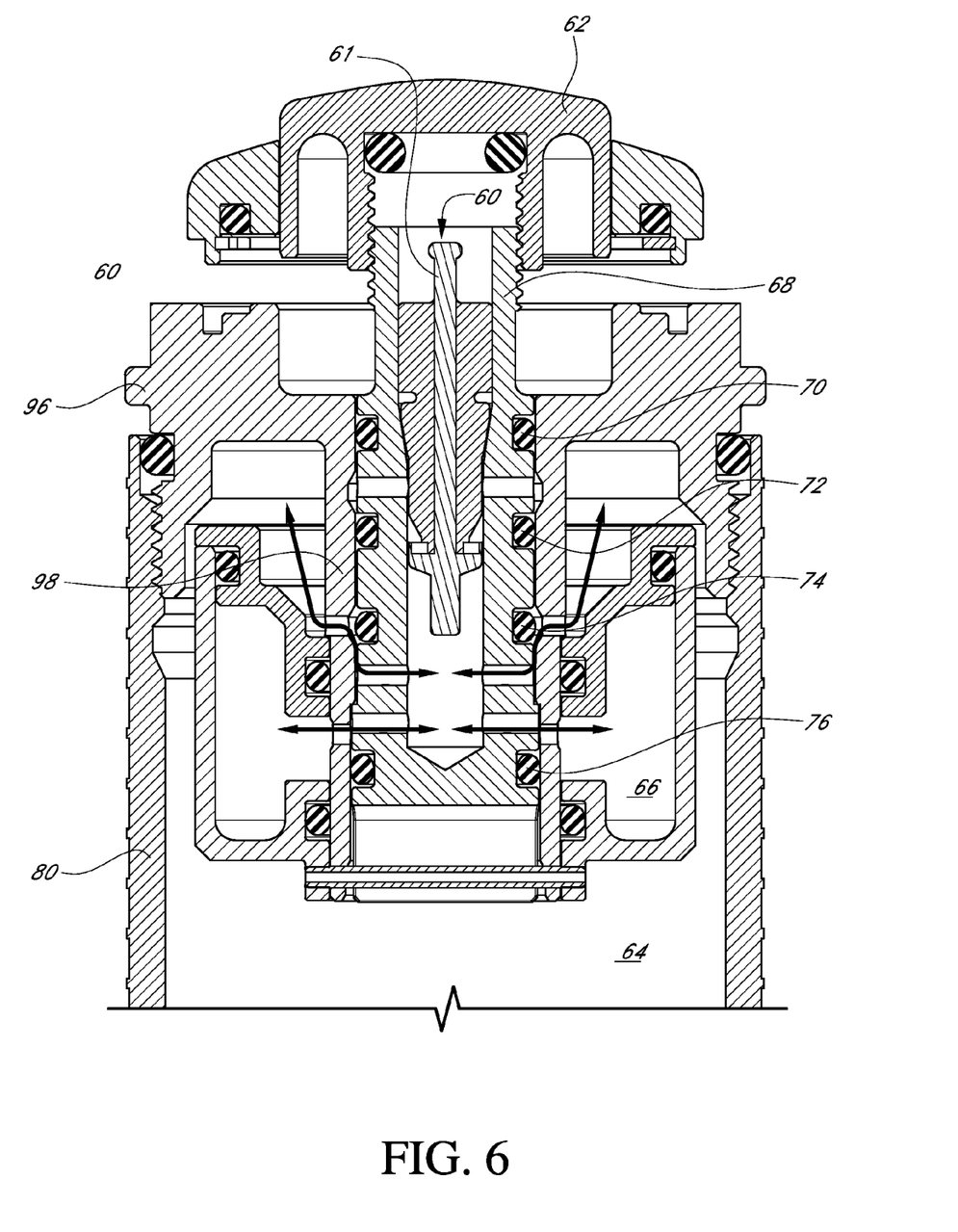
FIG. 6 is a cross section of a portion of a bicycle fork.
Figure 7:
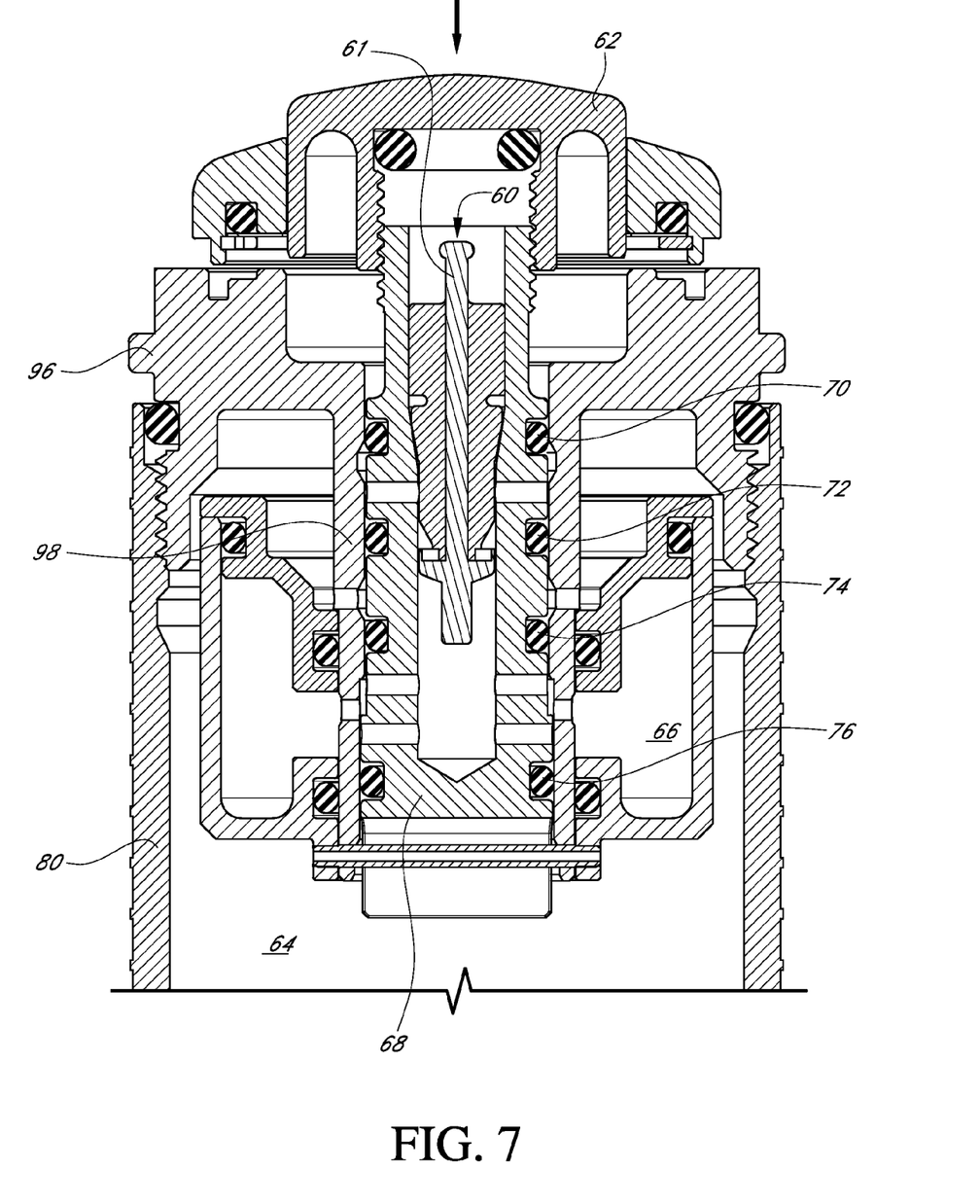
FIG. 7 is a cross section of a portion of a bicycle fork.
Figure 8:
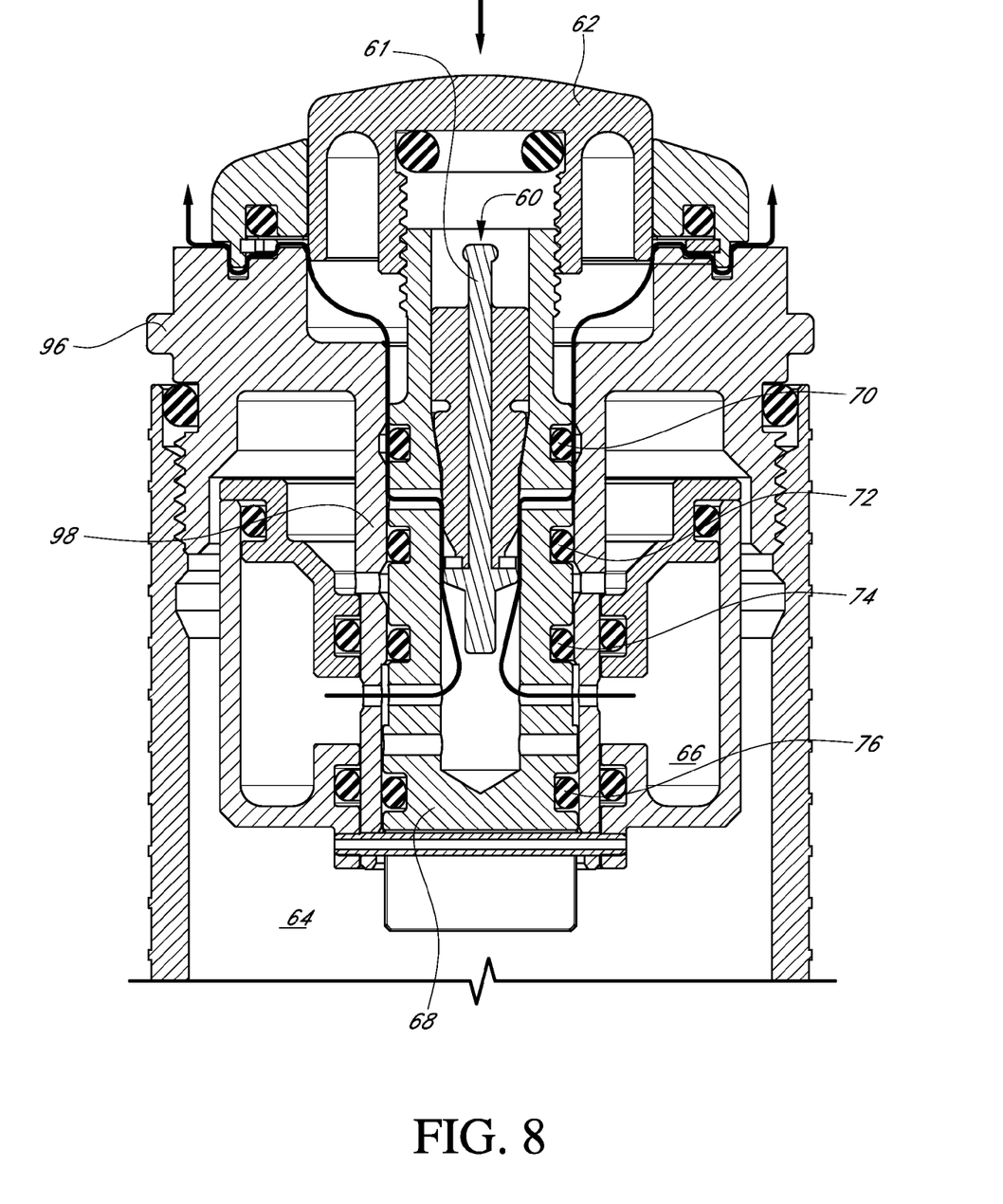
FIG. 8 is a cross section of a portion of a bicycle fork.

FIGS. 6-8 illustrate a method of reducing the air pressure within the shock in a controlled incremental manner. Looking first to FIG. 6, it can be seen that the cap 62 has been partially unscrewed from the outer valve housing 68. The cap 62 can be used as a button to press down on the outer valve housing 68. Alternatively, the cap 62 can be completely removed and the outer valve housing 68 can be advanced downwards directly by a user.

FIG. 6 shows the outer valve housing 68 before it has advanced downwards. It can be seen that though the first valve 60 is closed, the main air chamber 64 and the secondary air chamber 66 are still in fluid communication with one another. Thus, the main air chamber 64 and the secondary air chamber 66 will be at the same pressure.

In FIG. 7, the cap 62 and therefore the outer valve housing 68 is pressed down a first amount. It can be seen that all four of the seals 70, 72, 74, 76 are engaged with the both the outer valve housing 68 and the wall 98 of the shock body 96. Thus, air cannot pass through, by, or around any of the seals 70, 72, 74, 76. In this position the main air chamber 64 and the secondary air chamber 66 are no longer in fluid communication with one another. Both chambers 64, 66 are sealed off from one another. At this stage, the chambers 64, 66 will generally still be at the same pressure.

In FIG. 8, the cap 62 and outer valve housing 68 are pressed down to their farthest extent. Fluid communication is established between the secondary air chamber 66 and the atmosphere, i.e. outside of the shock. This results in a drop in air pressure in the secondary air chamber 66. The secondary air chamber 66 will now be at atmospheric pressure. The main air chamber 64 is sealed off by two of the seals 72, 74 so that it cannot communicate with either of the secondary air chamber 66 or the atmosphere.

The cap 62 and the outer valve housing 68 are then returned to their initial position shown in FIG. 6. The secondary air chamber 66 is again brought into fluid communication with the main air chamber 64. Because the secondary air chamber 66 coming from the position in FIG. 8 is at atmospheric pressure which is less than the pressure inside a pressurized shock, the combined main air chamber 64 and secondary air chamber 66 will now be at a lower pressure than before the procedure.

These steps of discharging small amounts of air from the main air chamber 64 through the secondary air chamber 66 can be repeated until the shock is at the desired air pressure.

According to one embodiment, a method of adjusting the air pressure within a shock can include one or more of the following steps: 1) connecting a pump to a first valve on a shock body, 2) injecting air from the pump into a main air chamber and a secondary air chamber within the shock, 3) removing the pump from the first valve, 4) actuating a second valve on the shock body by moving the second valve from an initial position to a second position, wherein the main air chamber and the secondary air chamber are in fluid communication in the initial position but are not in fluid communication in the second position, 5) releasing air from the secondary air chamber to reduce the pressure within the shock, the secondary air chamber being in fluid communication with the atmosphere but not the main air chamber, and 6) returning the second valve to the initial position and bringing the secondary chamber into fluid communication with the main air chamber. In some embodiments, the steps of filling the shock with air from a pump are done previous to the adjusting process. As has been mentioned, the second valve can be a valve housing surrounding the first valve.

According to another embodiment, a method of adjusting the air pressure within a shock can include one or more of the following steps: 1) depressing a valve housing and moving the valve housing from an initial position to a second position, the valve housing surrounding a valve on an interior surface, the valve configured to receive a pump for adding air to both a main air chamber and a secondary air chamber, the valve housing movable within a shock body, 2) releasing air from the secondary air chamber to reduce the pressure within the main air chamber, the air passing between an outer surface of the valve housing and the shock body while the valve housing is in the second position, the secondary air chamber being in fluid communication with the atmosphere but not the main air chamber, and 3) returning the valve housing to the initial position and bringing the secondary chamber into fluid communication with the main air chamber.

Preferably, the venting of air to the atmosphere releases only the air pressure of the secondary air chamber or volume adjusted chamber so that the drop in pressure is an exact amount each time the system is utilized. To vent the chamber a second time to atmosphere, the second valve must return to the start position where the secondary air chamber is in communication with the main air chamber of the spring system, and then the steps repeated. The desired pressure drop with each actuation of the second valve can vary depending on the final application. For most mountain bike forks, the ideal pressure drop is in the range of about 3-5 psi. To achieve the desired pressure drop and to determine the size of the volume adjusted chamber many factors can be considered including total air volume of the air spring, the travel of the air spring, and typical starting air pressure.

The improved shock absorber can provide a mechanism for bleeding down the air pressure of an air spring system in a controlled, precise way. Air springs are generally the spring system of choice on mountain bikes due to the lighter weight (compared to coil or elastomer springs) as well as the broad range of rate adjustability achieved by simply changing the air pressure in the air spring chamber. Though this broad spring rate adjustability can also cause many set-up problems, the improved shock absorber can allow the user to have more control to achieve the proper spring rate for the specific rider. This can be done in less time and generally eliminates or reduces the incidents of deflating the shock too much.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. A method of adjusting the air pressure within a shock absorber comprising:
   connecting a pump to a first valve on a shock body;
   injecting air from the pump into a main air chamber and a secondary air chamber within the shock absorber;
   removing the pump from the first valve;
   actuating a second, valve on the shock body by moving the second, valve from an initial position to a second position, wherein the main air chamber and the secondary air chamber are in fluid communication in the initial position but are not in fluid communication in the second position;
   releasing air from the secondary air chamber to reduce the pressure within the shock absorber, the secondary air chamber being in fluid communication with the atmosphere but not the main air chamber; and
   returning the second valve to the initial position and bringing the secondary chamber into fluid communication with the main air chamber;
   wherein actuating a second valve comprises depressing a valve housing surrounding the first valve; and
   wherein releasing air from the secondary air chamber comprises allowing air to leave the secondary air chamber, the air flowing to the atmosphere between an exterior surface of the valve housing and a surface of the shock body and not through the first valve.

2. The method of claim 1, wherein releasing air from the secondary air chamber and returning the second valve to the initial position and bringing the secondary chamber into fluid communication with the main air chamber further comprises decreasing the air pressure within the shock absorber by 3-5 psi.

3. The method of claim 1, further comprising removing a cap covering both the first valve and the second valve prior to connecting the pump to the first valve.

4. The method of claim 1, further comprising repeating the steps of actuating, releasing and returning, thereby discharging small amounts of air from the main air chamber through the secondary air chamber until the shock absorber is at a desired air pressure.

5. A method of adjusting the air pressure within a shock absorber comprising:
- depressing a valve housing and moving the valve housing from an initial position to a second, position, the valve housing surrounding a valve on an interior surface, the valve configured to receive a pump for adding air to both a main air chamber and a secondary air chamber through the valve, the valve housing movable within a shock body and the valve movable within the valve housing;
- releasing air from the secondary air chamber to reduce the pressure within the main air chamber, the air passing between an outer surface of the valve housing and the shock body while the valve housing is in the second position, the secondary air chamber being in fluid communication with the atmosphere but not with the main air chamber; and
- returning the valve housing to the initial position and bringing the secondary chamber into fluid communication with the main air chamber.

6. The method of claim 5, wherein releasing air from the secondary air chamber and returning the valve housing to the initial position and bringing the secondary chamber into fluid communication with the main air chamber further comprises decreasing the air pressure within the shock absorber by 3-5 psi.

7. The method of claim 5, wherein depressing the valve housing further comprises depressing a cap covering the valve and connected to the valve housing.

8. The method of claim 5, further comprising sealing off the secondary air chamber from the main air chamber as the valve housing moves from the initial position to the second position.

9. The method of claim 8, wherein after sealing and before releasing, the air pressure of the main air chamber and the secondary air chamber are the same.

* * * * *